(No Model.)  
4 Sheets—Sheet 1.
H. F. GASKILL.
LIQUID METER.
No. 313,860. Patented Mar. 17, 1885.
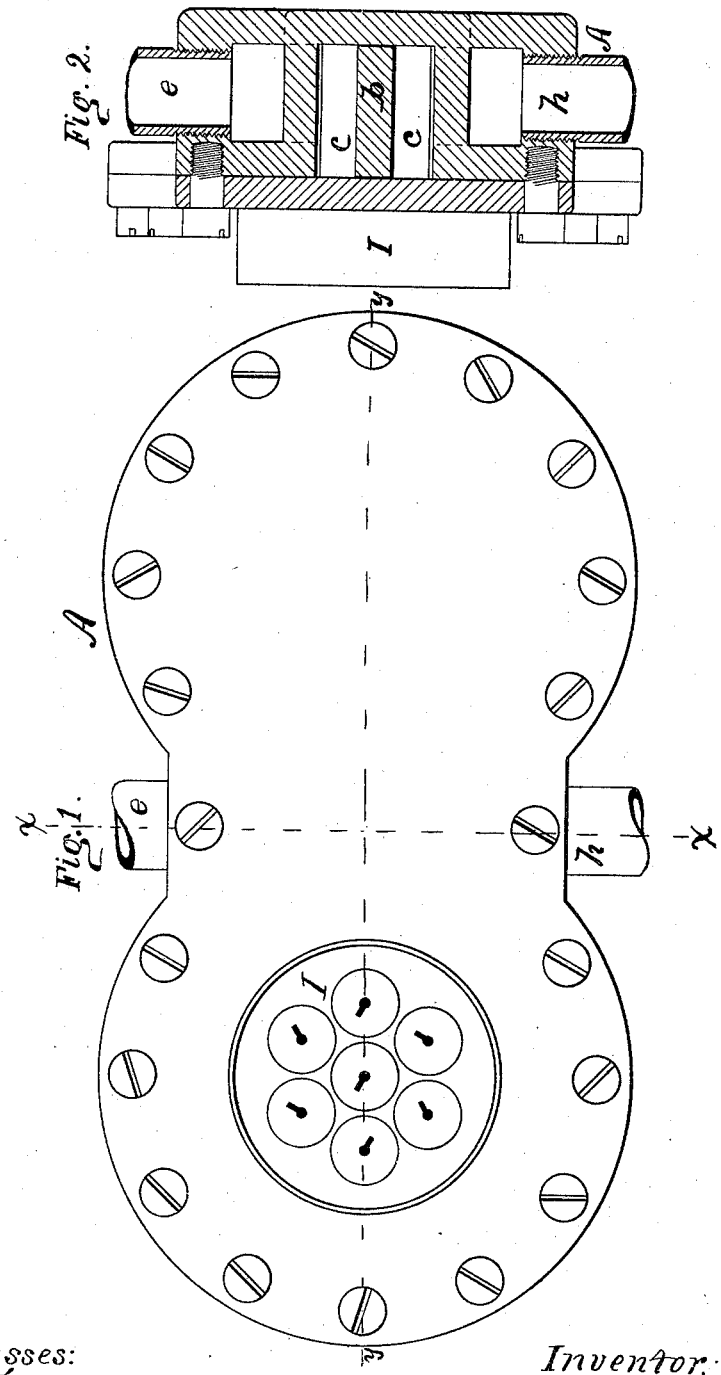
Witnesses:  
H. H. Hopkins  
H. C. Hagen
Inventor:  
H. F. Gaskill  
By Geo. M. Hopkins  
Attorney.

(No Model.) 4 Sheets—Sheet 2.
H. F. GASKILL.
LIQUID METER.
No. 313,860. Patented Mar. 17, 1885.
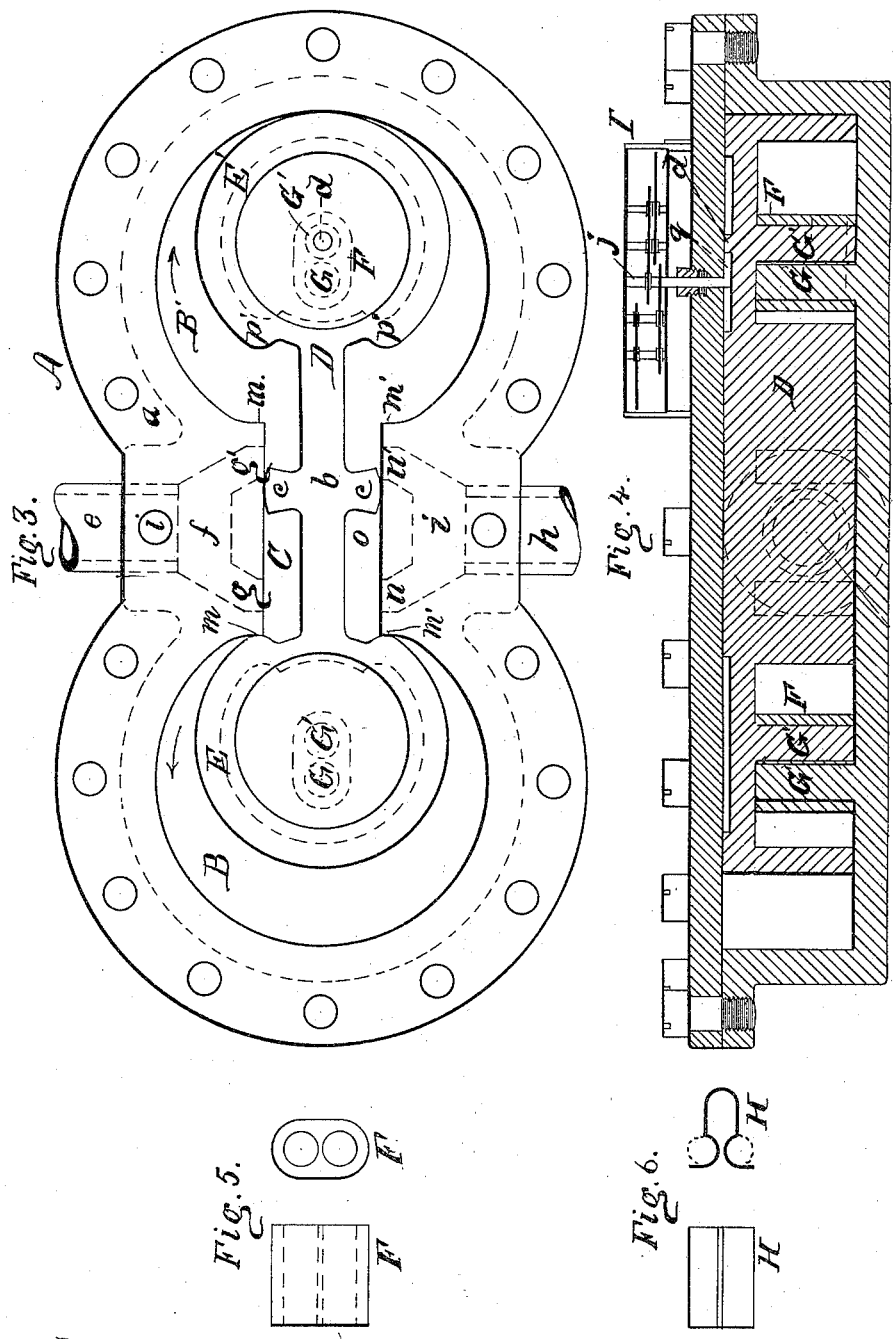

(No Model.) 4 Sheets—Sheet 3.

H. F. GASKILL.
LIQUID METER.

No. 313,860. Patented Mar. 17, 1885.

WITNESSES:
Gustave Dieterich
Fred K. Cutwohl

INVENTOR
H. F. Gaskill
BY
Geo. M. Hopkins
ATTORNEY (No Model.) 4 Sheets—Sheet 4.

H. F. GASKILL.
LIQUID METER.

No. 313,860. Patented Mar. 17, 1885.

Witnesses:
H. M. Hopkins
H. C. Hagen.

Inventor:
H. F. Gaskill
By Geo. M. Hopkins,
Attorney.

UNITED STATES PATENT OFFICE.

HARVEY F. GASKILL, OF LOCKPORT, NEW YORK.

LIQUID-METER.

SPECIFICATION forming part of Letters Patent No. 313,860, dated March 17, 1885.

Application filed September 1, 1884. (No model.)

*To all whom it may concern:*

Be it known that I, HARVEY F. GASKILL, of Lockport, in the county of Niagara, State of New York, have invented a new and useful Improvement in Liquid-Meters, of which the following is a specification, reference being had to the annexed drawings, forming a part of the same, in which—

Figure 7:
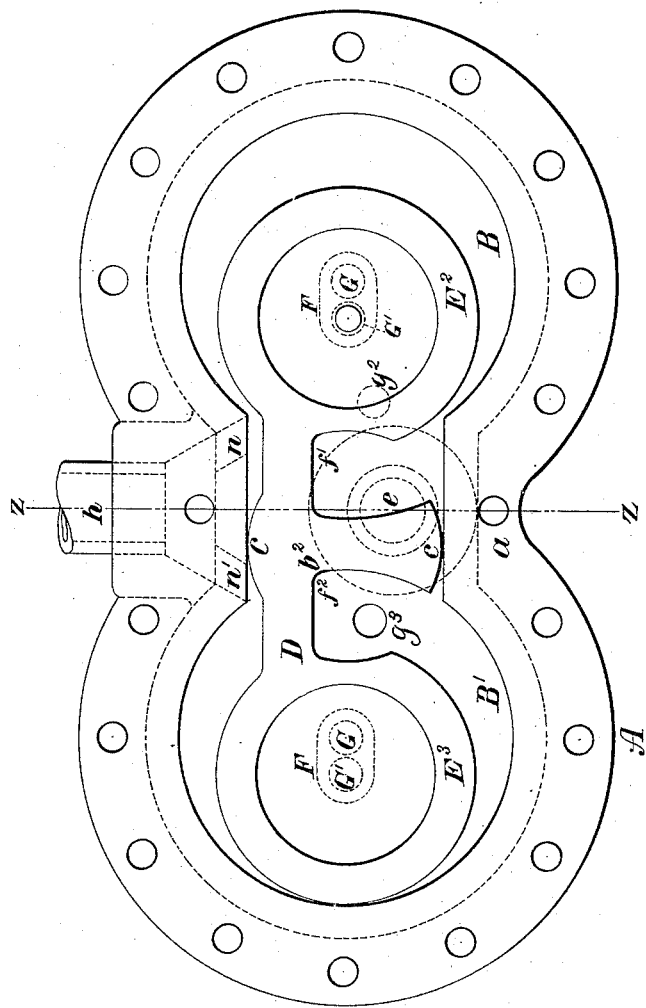
Figure 8:
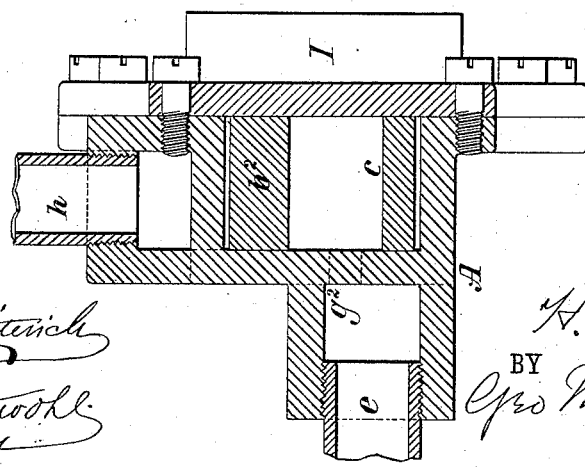
Figure 10:
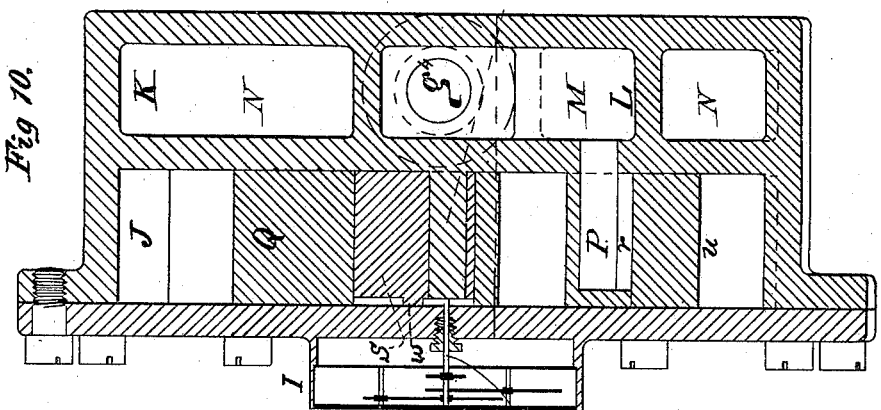
Figure 9:
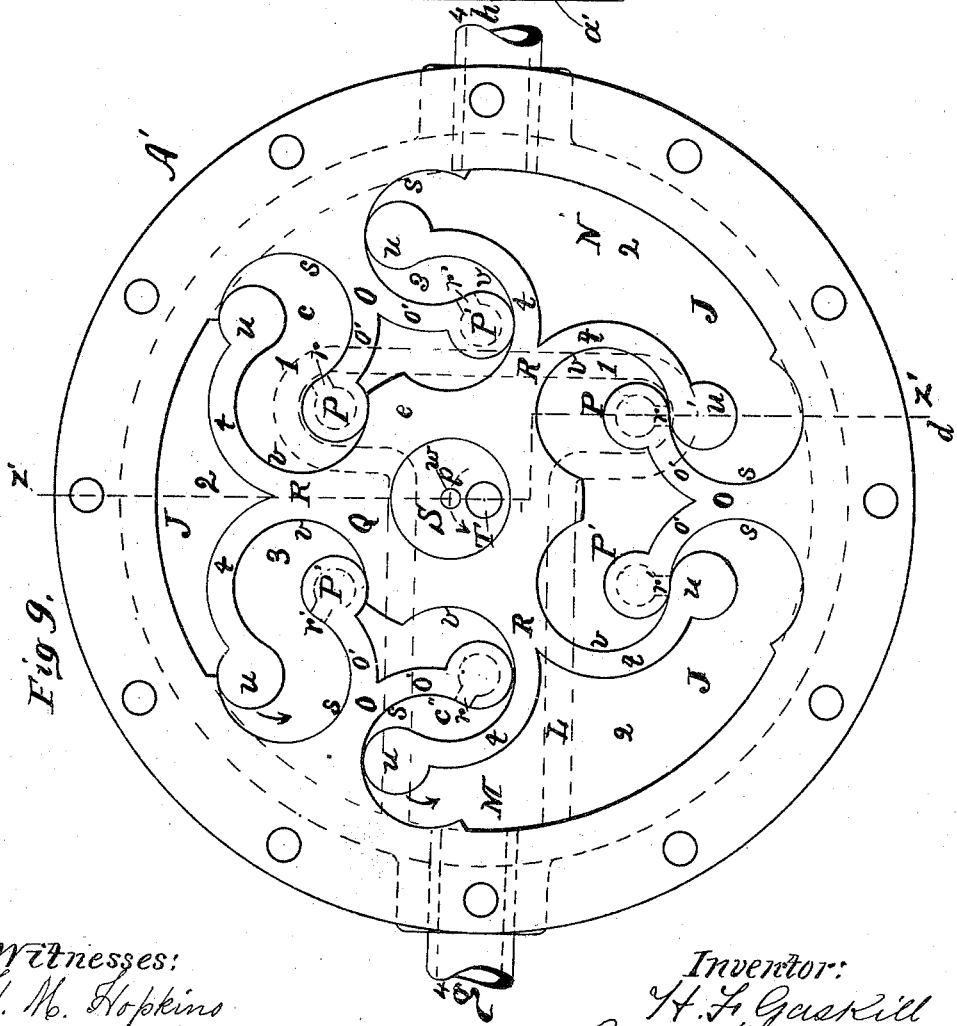

Figure 1 is a side elevation of my improved meter. Fig. 2 is a transverse section taken on line $x\ x$ in Fig. 1. Fig. 3 shows a meter with the cover removed. Fig. 4 is a longitudinal section taken on line $y\ y$ in Fig. 1. Fig. 5 shows a rigid connecting-link, and Fig. 6, a spring connecting-link. Fig. 7 is a modified form of the meter shown in Figs. 1 to 4, inclusive. Fig. 8 is a transverse section taken on line $z\ z$ in Fig 7. Fig. 9 shows my improved meter with a multiple piston, and Fig. 10 is a transverse section taken on line $z'\ z'$ in Fig. 9.

The object of my invention is to provide a simple and effective mechanism for automatically measuring liquids flowing through pipes.

My invention consists in a casing having cylindrical chambers and in connected oscillating pistons, fitted to the said chambers and capable of being moved by the pressure of the fluid passing through the meter; and it also further consists in the combination, with the oscillating pistons, of mechanism for recording the quantity of fluid passing through the meter.

The casing A is formed of two cylindrical portions, B B′, connected by a straight rectangular passage, C. The supply-pipe $e$ enters the side of the casing A and communicates with the passage $f$, leading to the supply-ports $g\ g'$. The discharge-pipe $h$ leads from the passage $i$ in the discharge side of the meter, and the said passage $i$ communicates with the discharge-ports $n$ and $n'$.

In the casing A is located the piston D, having two cylindrical ends, E and E′, connected by a bar, $b$, extending through the rectangular passage C, and provided with lateral projections $c$, which, together with the bar $b$, exactly fill the the passage C at a point in the length of the said passage between the ports $g\ n$ and $g'\ n'$. The outer or contact surfaces of the projections $c$ are made convex, so that when the cylindrical ends of the piston D are oscillated the said projections will always touch the sides of the passage C. The cylindrical ends E E′ of the piston D are chambered to receive the links F, which turn on studs G, projecting from the bottom of the casing A, and receive in their free ends the studs G′, projecting from the under surface of the cylindrical ends E E′ of the piston D. The cylindrical ends E and E′ are notched at their point of connection with the bar $b$, and the angles thus formed are rounded and adapted to engage the inwardly-curved surfaces $m\ m'$ of the walls of the chambers B B′. The cylindrical ends E and E′ of the piston D are always in contact with the inner walls of the casing A, and by virtue of their connection with the fixed studs G, by means of the links F and the bearing of the projection $c$ on the walls of the passage C, the said ends E and E′ are made to revolve in opposite directions.

Liquid entering through the supply-pipe $e$ passes through the ports $g$ and $g'$ and the area of the piston D exposed to the liquid-pressure being at this moment greatest on the cylindrical end E′, said end is pushed forward in the direction of the arrow, the chamber B′ receiving liquid on the supply side of the piston and discharging it through the port $n'$ on the discharge side of the piston. When the cylindrical end E′, in moving forward on the inner surface of the casing A, arrives at the point $m'$, the cylindrical end E of the piston will have moved forward in the direction of the arrow a sufficient distance to expose an effective surface to the action of the liquid entering the supply side of the meter through the port $g$, when the liquid contained in the discharge side of the meter in the chamber B will be forced out through the port $n$. The action of the piston will be maintained so long as liquid under pressure is supplied through the pipe $e$. The chambers B and B′ are separated from each other by the bar $b$ and the projection $c$, and the cylindrical ends E and E′ of the piston act independently of each other in receiving and discharging the liquid.

By enlarging the studs G G′, so that they may touch each other as the cylindrical ends E and E′ of the piston are revolved, the links F may be dispensed with, or, in lieu of the links F, I may employ a spring, H, (shown in Fig. 6,) which will be inserted between the studs G and G', and tend to force them apart and thus maintain the contact between the piston and the walls of the casing A.

Registering mechanism I, of any improved construction, is attached to the cover of the meter and receives its motion through a shaft, $j$, passing through a stuffing-box in the meter-cover and provided with an arm, $q$, which is engaged by a stud, $d$, projecting from the surfaces of the cylindrical end E' of the piston D.

The meter thus described has no valves, and depends for its action upon the varying area of the piston exposed to the liquid-pressure. In Fig. 7 I have represented a meter in which the cylindrical ends $E^2$ and $E^3$ of the piston D are connected by a bar, $b^2$, located at one side of the center line of the piston, to form passages $f'$ $f^2$ for the admission of liquid to the supply side of the meter. Ports $g^2$ and $g^3$ enter the casing A, in position to be alternately covered by the cylindrical ends $E^2$ $E^3$ of the piston and opened so as to admit liquid to the passages $f'$ $f^2$. In this form of meter the cylindrical ends $E^2$ and $E^3$ are not always maintained in contact with the inner surfaces of the cylindrical chambers B and B'; but the direct flow of water through the meter is prevented when the said cylindrical ends are not in contact with the inner surfaces of the casing by the covering of the inlet-ports $g^2$ $g^3$ alternately by the said cylindrical ends. In this case it will be seen that the piston acts as its own valve for regulating the admission of liquid to the supply side of the meter. The liquid is discharged from the meter through the ports $n$ $n'$, as in the case before described, and communication between the chambers B B' is prevented by the convex projections $c$ $c$, as in the meter shown in Fig. 3.

In the meter shown in Figs. 9 and 10 the casing A' is made cylindrical and divided into two general compartments, J K, lying in different planes. The compartment K is divided by a partition, L, forming a supply-passage, M, and discharge-passage N. The compartment J is provided with three pairs of curved abutments, O, projecting radially from the inner curved surface of the casing A, and each formed of two curved arms, $o'$, terminating at their inner extremities in the hollow cylinders P and P'. The cylinders P communicate with the supply-passage M, and also with the interior of the chamber J, through the ports $r$, and the hollow cylinder P' communicates with the discharge-passage N and with the interior of the chamber J through the ports $r'$. The curved surfaces $s$ of the abutments O are formed upon a circle corresponding with the path of the piston Q, inclosed in the compartment J. The piston Q is provided with three symmetrically-arranged forked arms, R, whose branches $t$ curve in opposite directions and terminate in cylindrical ends $u$. The curved surfaces $v$ of the arms R of the piston Q are formed on a circle described by the piston, and the cylindrical ends $u$ of the arms $t$ are capable of following the curved surfaces $s$ of the abutments O, while the curved surfaces $v$ of the piston Q contact with the hollow cylinders P and P'. The piston Q is apertured centrally to receive an eccentric, S, which turns upon the stud T, arranged axially in the casing A'. Every part of the piston Q describes a circle corresponding with the path of the axis of the eccentric S.

Water entering the passage M through the supply-pipe $g^4$ flows through the hollow cylinders P and ports $r$ into the spaces 1, causing the cylindrical ends $u$ of the piston to move forward in the direction of the arrow as the spaces 1 are enlarged by the forward movement of the piston Q, due to the liquid-pressure. At the same time the water which has been discharged from the spaces 1 into the spaces 2 and received in the spaces 3 will be forced outward by the forward movement of the piston through the ports $r'$ and hollow cylinders P' into the discharge-passage N, whence it flows through the discharge-pipe $h^4$.

The motion of the piston Q is continuous, and a stud, $w$, projecting from the eccentric S, carries a crank formed on the inner end of a spindle, $a'$, extending through a stuffing-box in the cover of the casing A', and actuating an ordinary recording mechanism, I, attached to the cover of the casing.

Having thus described my invention, what I claim as new, and desire to secure by Letters Patent, is—

1. In a liquid-meter, the combination of a casing provided with supply and discharge ports, and having two or more similar cylindrically-curved interior surfaces, and a piston having two or more similar curved surfaces capable of moving in tangential contact in a plane at right angles to the axes of the cylinders with the curved surfaces of the casing, for forming alternately enlarged and contracted chambers for receiving and discharging liquids in uniformly-measured quantities, as herein specified.

2. In a liquid-meter, the combination, with a casing provided with supply and discharge ports, and having two connected cylindrical chambers, of a piston formed of two cylindrical ends, said ends moving in tangential contact with the curved surface of the casing in a plane at right angles to the axes of the cylinders, and a bar connecting the said ends and provided with lateral projections adapted to stop the passage connecting the two cylindrical chambers, as herein specified.

3. In a liquid-meter, the combination of the casing A, having cylindrical chambers B B', connected by the passage C, and provided with supply and discharge ports and studs G, the piston D, formed of cylindrical ends E E', connecting-bar $b$, and projections $c$ $c$, and the studs G', substantially as specified.

4. The combination, with the piston D, having chambered cylindrical ends E E' and studs G', and the casing A, having cylindrical chambers B B', provided with studs G, of links for connecting the said studs G' and G, as herein specified.

5. The combination, with a casing containing a piston with cylindrical ends capable of turning in opposite directions, of registering mechanism, and means for communicating motion thereto from one of the cylindrical ends of the piston, as specified.

6. In a liquid-meter, the combination, with the casing A, having supply-ports $g^2 g^3$ in the plane side thereof and in the path of the piston, of the piston D, having passages $f' f^2$, and capable of covering and uncovering the supply-ports $g^2 g^3$ in alternation, as herein specified.

HARVEY F. GASKILL.

Witnesses:
A. H. WEBSTER,
DAN. E. MCGRATH.